vention

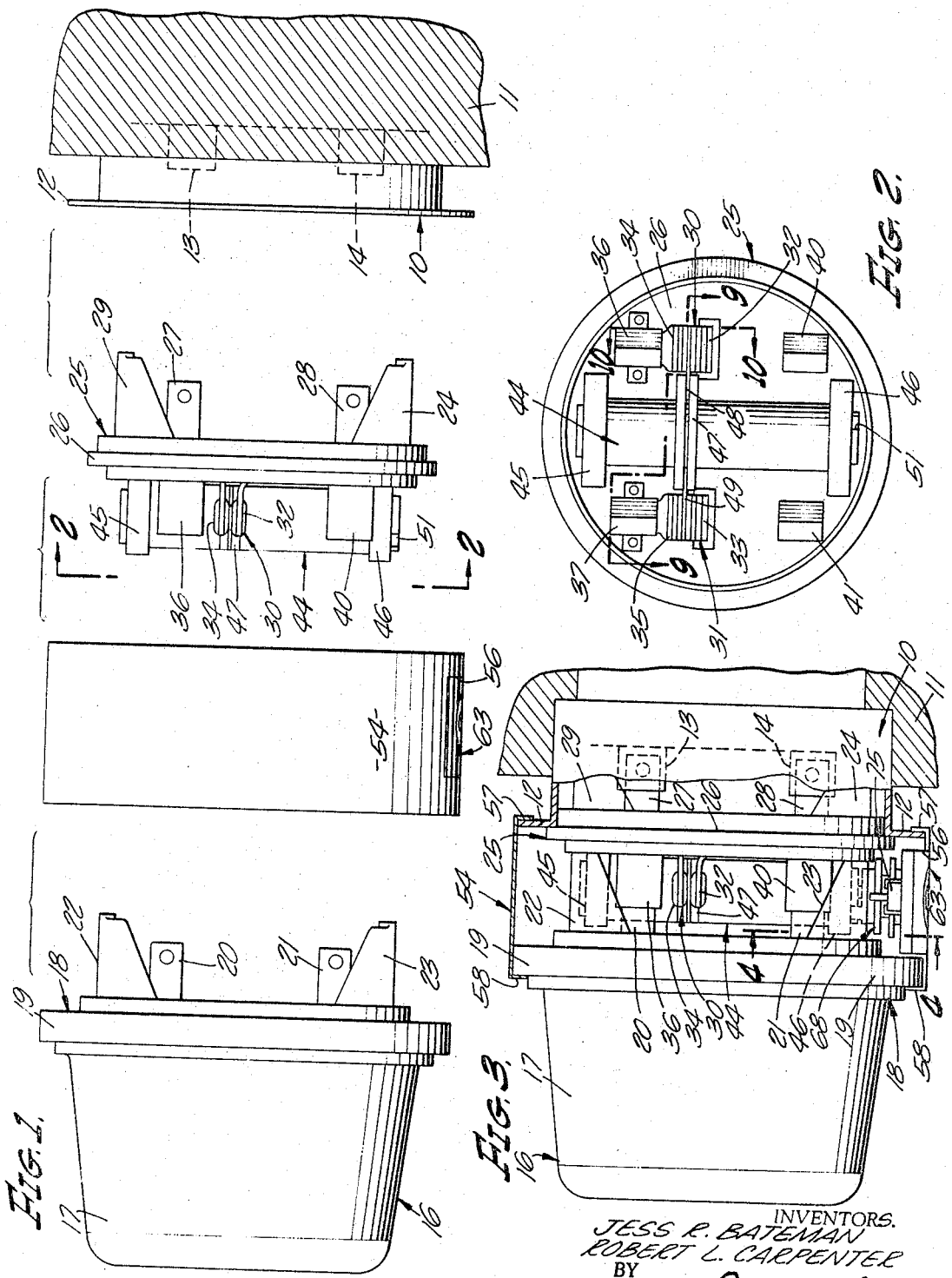

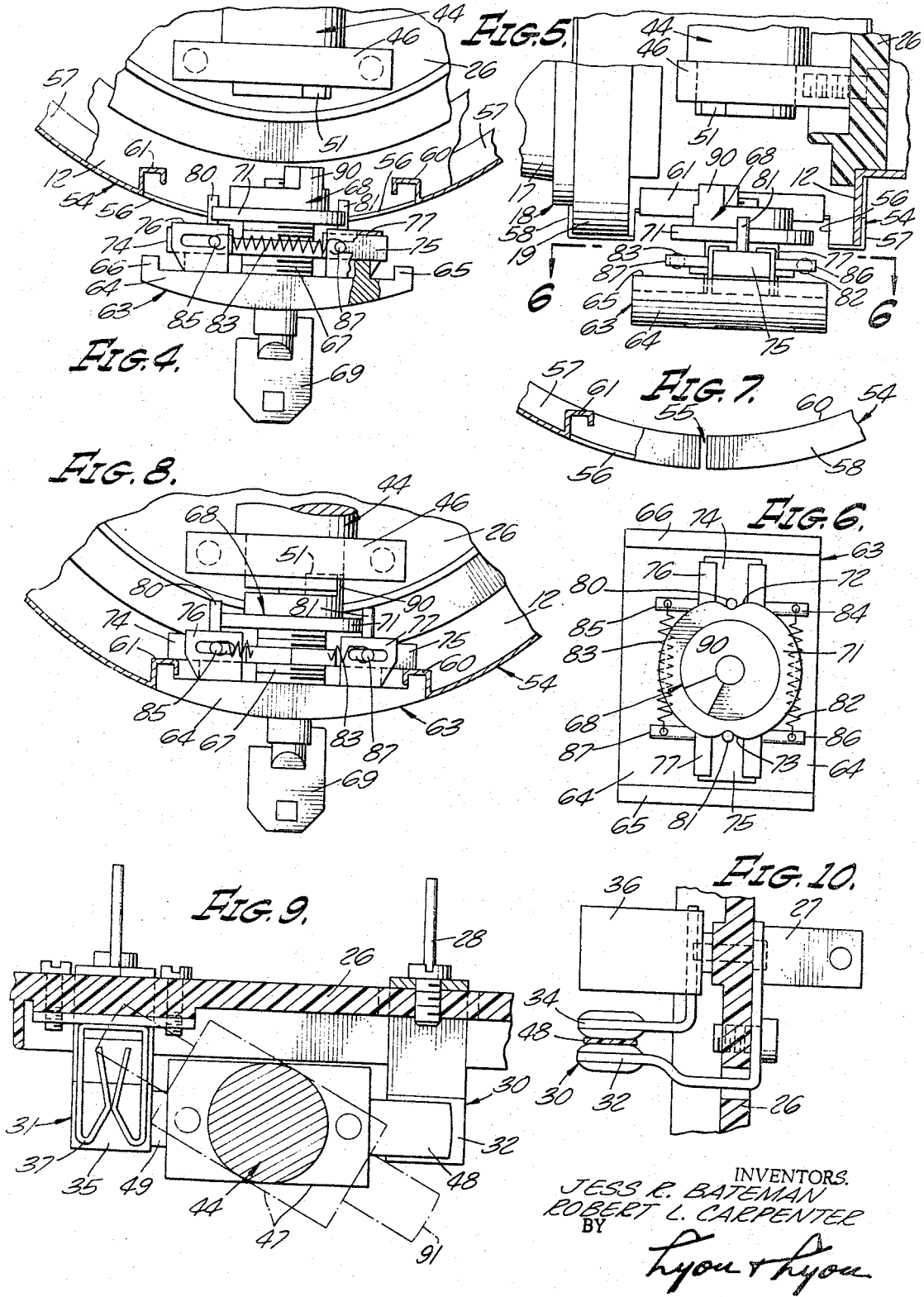

United States Patent Office 3,334,276
Patented Aug. 1, 1967

3,334,276
METER SWITCH AND LOCKING DEVICE
Jess R. Bateman, 11857 Doty Ave., Hawthorne, Calif. 90250, and Robert L. Carpenter, 11810 Aviation Blvd., Inglewood, Calif. 90304
Filed Sept. 29, 1966, Ser. No. 582,834
10 Claims. (Cl. 317—108)

This invention relates to meters and more particularly to a switch and locking arrangement for watt-hour meters and the like.

A typical electrical energy meter, such as the watt-hour meters utilized by electrical companies for recording the power consumption over a period of time at a house or factory, includes a socket attached to the building and a meter recording head which is coupled with the socket. The consumption of electric power by the user is recorded by the meter and a periodic meter reading is made for billing purposes. Frequently, the power service to the user must be disconnected or connected, or the recording head repaired or removed. The power service usually is disconnected by removing the head and breaking an electrical connection through the use of insulating sleeves or the like.

The recording head normally is secured to the socket by a clamp ring having a seal affixed thereto, and removal and reinstallation of the ring and seal is time consuming when removing the meter head for repair or for changing the power service. Also, the clamp ring and seal can be removed by unauthorized personnel resulting in unauthorized reconnection of the power service or tampering with the meter. Thus, not only is it time consuming to disconnect or connect the power service, but also extensive costs and repairs frequently are occasioned by unauthorized connection of power or tampering with the meter.

On the average, it takes approximately three and one-half minutes to connect or disconnect the electrical service including the time required in removing the meter head, reattaching it to the socket, affixing a seal, etc. A considerable time and expense is involved in repairing and replacing the equipment, as well as possible loosening of the socket with respect to the building occasioned by the force sometimes required to position the meter head back into the socket. Additionally, there is a shock or electrocution danger involved in connecting or disconnecting electrical service, especially during inclement weather.

Accordingly, it is an object of the present invention to provide an improved meter switch and locking device.

An additional object of this invention is to provide a meter switch and locking device whereby electrical service may be connected or disconnected relatively simply and quickly.

A further object of this invention is to provide an improved meter switch and locking device which is substantially tamper-proof.

Another object of this invention is to provide an improved meter switch and locking device for facilitating installation and removal of a meter head in a safe and efficient manner.

These and other objects and advantages of this invention will be better understood upon a consideration of the following description taken in conjunction with the attached drawings in which:

FIGURE 1 is an exploded elevational view of a conventional meter head and socket along with a meter adapter and locking ring for coupling the head with the socket in accordance with the present invention;

FIGURE 2 is a view taken along a line 2—2 of FIGURE 1;

FIGURE 3 is an elevational view, partly in section, of the components of FIGURE 1 coupled together;

FIGURE 4 is a front cross sectional view taken along a line 4—4 of FIGURE 3;

FIGURE 5 is a fragmentary cross sectional view of a portion of the assembly shown in FIGURE 3;

FIGURE 6 is a cross sectional view taken along a line 6—6 of FIGURE 5;

FIGURE 7 is a partial end view of a locking ring;

FIGURE 8 is a view similar to FIGURE 4 but illustrating the parts in a locked position;

FIGURE 9 is a cross sectional view taken along a line 9—9 of FIGURE 2; and

FIGURE 10 is a cross sectional view taken along a line 10—10 of FIGURE 2.

Referring now to the drawings, a conventional power meter socket 10 is shown secured to the side of a building 11. The socket includes a flange 12 and four female spring terminals, only two terminals 13 and 14 being seen in dashed lines in FIGURE 1. The upper terminals of the socket 10 are coupled with the power line (not shown) and the lower terminals thereof are the load terminals. A conventional meter recording head 16 includes a glass envelope 17 and a meter base 18 having a flange 19. The meter base includes four male knife terminals, only two terminals 20 and 21 being seen. Guides 22 and 23 project from the base of the head and facilitate installation of the recording head 16 into the socket 10.

According to a principal feature of the present invention, a switch and locking arrangement is provided either in the form of an adapter or as in internal part of a meter for coupling the recording head with the meter socket. Thus, although the present invention will be discussed in terms of an adapter for use with a conventional meter assembly, it will be appreciated that the concepts of the present invention are equally applicable to a similar arrangement provided within the meter assembly itself. An adapter, generally designated by a reference numeral 25, has a base 26 formed of insulating material. Four male knife terminals, only terminals 27 and 28 being seen in FIGURE 1, extend from the body 25 in the same manner as the meter recording head 16. Guides 29 and 30 also are provided. Thus the body, terminals and guides are constructed like the equivalent members for the recording head 16 and mate with the socket 10 in a similar manner.

Spring contact disconnects 30 and 31 are mounted on the body 26 of the adapter 25 as best seen in FIGURES 1, 2, 9 and 10. Lower contacts 32 and 33 of the respective disconnects 30 and 31 are electrically connected with the upper male knife terminals of the adapter. Upper contacts 34 and 35 of the respective disconnects 30 and 31 are electrically connected with female spring terminals 36 and 37 which receive the upper male knife terminals of the meter recording head 16. The lower male knife terminals of the adapter 25 are electrically connected with female spring terminals 40 and 41. It will be appreciated that the terminals are otherwise insulated from each other.

A switch actuator 44 has its respective ends mounted for rotation in upper and lower supports 45 and 46 which are secured to the body 26. A switch arm 47 carrying fingers 48 and 49 of insulating material at the ends thereof is affixed to the actuator 44. The actuator 44 may be rotated to cause the fingers 48 and 49 to separate the contacts 32, 34, and 33, 35 of the respective disconnects 30 and 31 to thereby disconnect power service, or rotated into a nonengaging position with respect to the contacts 32 through 35 to connect power service. As will appear subsequently, the actuator 44 includes a slot 51 which is engaged by a locking mechanism which serves to either connect or disconnect service and to lock the meter head 16 and adapter 25 to the socket 10.

A locking ring 54 is split at the bottom at 55 and has a slot 56 therein as shown in FIGURE 7. The sides of the ring 54 are inturned at 57 and 58 as best seen in FIGURE 3 for respectively engaging the flange 12 of the socket 10 and the flange 19 of the recording head 16. The ring 54 preferably is made of spring steel and is positioned about the adapter 25 to lock the adapter 25 to the socket 10 and the recording head 16 to the adapter 25 as shown in FIGURE 3.

The ends of the ring 54 are bent to form tabs or channels 60 and 61 as best seen in FIGURES 4, 7 and 8. A locking mechanism, generally designated by a reference numeral 63 includes a cover or cap 64 having protuberances 65 and 66 for respectively engaging the channel members 60 and 61 of the ring 54 for retaining it in a locked position. The locking mechanism 63 includes a conventional key operated lock 67 for rotating an actuator member 68 in response to rotation of a key 69. The actuator member 68 includes a flange 71 having opposing depressions 72 and 73 on the periphery thereof as seen in FIGURE 7 and serves as a cam for moving locking bars 74 and 75. The locking bars are retained in respective slide members 76 and 77 affixed to the cover 64. The bars 74 and 75 are actuated by the periphery of the flange 71 by means of respective pins 80 and 81, and are normally inwardly spring biased by means of springs 82 and 83 coupled with arms 84, 85, and 86, 87 attached to the bars.

Thus, the locking mechanism 63 is positioned with the ring 54 so that the protuberances 65 and 66 engage the respective channels 60 and 61. The key 69 is inserted and rotated to a first position thereby causing the periphery of the flange 71 to cause the locking bars 74 and 75 to lock with the channel members 60 and 61 as shown in FIGURE 8.

The actuator 68 includes a projection 90 for engaging the slot 51 in the switch actuator 44. Further rotation of the key 69 thereby causes the actuator 68 to rotate the switch arm 47 to a position shown in phantom lines 91 in FIGURE 9 thereby connecting power service. Hence, the locking mechanism 63 is coupled with the ring 54, the key 69 is rotated to a first position to lock the ring at which point the arm 47 may be in the full line position shown in FIGURE 9 with service disconnected, and the key 69 may be rotated further to connect service while the ring 54 is still locked onto the socket 10, adapter 25 and recording head 16.

It will be apparent that the adapter 25, ring 54 and locking mechanism 63 not only provide a simple means for locking a recording head to a meter socket easily and securely in an essentially tamper-proof manner, but also provide a simple means for connecting or disconnecting power service without requiring the recording head to be removed. Although an adapter is shown and described, it will be apparent that the concepts of the invention may be employed to provide a similar switching arrangement within a meter assembly for use along with a locking ring. An arrangement of the nature herein described in the form of an adapter or incorporated in the recording head significantly reduces the time required for turning on or off the power service, as well as making the various repairs frequently occasioned because of removal and installation of the head with the socket, and reduces the possibility of annoyance to customers and possible shock or electrocution when removing or installing the recording head.

The present embodiments of the invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. In an electrical meter having a head removable from a socket, the combination comprising
   body means having line and load conductors and switch means coupled therebetween for interrupting electrical current from said line to load conductors,
   locking ring means adapted to be coupled about said body means, and including an opening therein and tab means adjacent said opening, and
   locking means having a cover fitting within said opening and having protuberances for engaging said tab means and locking said ring means about said body means, said locking means including a key operated lock for securing said locking means to said ring means and having actuating means coupled therewith and adapted to engage said switch means for operating said switch means while said locking means is coupled with said ring means.

2. The combination of claim 1 wherein
   said switch means includes rotatable arm means having fingers for separating electrical contacts, and rotation of said arm means to a first position by said locking means moves said fingers between said contacts and rotation to a second position removes said fingers from between said contacts.

3. The combination of claim 2 wherein
   said locking ring means is formed of spring steel, and includes inturned flanges for coupling a meter head with a meter socket.

4. The combination of claim 3 wherein
   said locking means includes slidable bar means for engaging said tab means on said ring means for retaining said cover of said locking means substantially flush with respect to the periphery of said ring means,
   said arm means of said switch means includes a shaft mounted on said body means for rotation, said shaft having a slot therein, and
   said actuating means of said locking means includes a protuberance for engaging said slot in said shaft.

5. An adapter and locking ring for coupling and securing a meter recording head with a meter socket comprising
   said adapter including body means having line and load conductors and switch means coupled therebetween for interrupting electrical current from said line to said load conductors, terminals coupled with said conductors adapted to engage mating terminals in said socket and mating terminals in said head,
   said locking ring adapted to be coupled about said body means for securing said adapter between said head and said socket, said ring including an opening therein and tab means adjacent said opening, and
   locking means having a cap for engaging said opening and having protuberances for engaging said tab means for locking said ring about said body means and securing said head and socket to said body means, said locking means including a key operated lock for securing said locking means to said ring and having actuating means coupled with said lock and said switch means for operating said switch means while said locking means is coupled with said ring.

6. An adapter for coupling a meter recording head with a meter socket comprising
   a body having a plurality of male terminals extending therefrom for engaging terminals of said meter socket, and having a plurality of female terminals extending therefrom for engaging terminals on said meter head,
   switch disconnect means mounted on said body coupled between a pair of said male terminals and a pair of said female terminals,
   shaft means mounted on said body for rotation with respect thereto, said shaft means having a mating portion for mating with a locking member for causing rotation of said shaft means, and arm means affixed to said shaft means and having finger means for engaging said switch disconnect means for connecting and disconnecting said switch disconnect means in response to rotation of said shaft means.

7. A locking ring and locking mechanism for coupling and locking a recording meter head to a meter socket comprising said locking ring including flanged sides for engaging a meter head and a meter socket, and including an opening therein and tab means adjacent said opening, and said locking mechanism having a cap for engaging said opening in said locking ring and having protuberances for engaging said tab means for locking said mechanism to said ring, said locking mechanism including a key operated lock for securing said locking mechanism to said ring and including slidable bar means for engaging said tab means on said ring.

8. In a watt-hour type meter having a recording head and socket, the combination comprising body means having line and load conductors and switch means coupled therebetween for interrupting electrical current from said line to said load conductors, terminals coupled with said conductors adapted to engage mating terminals in a meter socket, a locking ring adapted to be coupled about said body means for securing said body means to said socket, said ring including an opening therein and tab means adjacent said opening, and locking means having a cap for engaging said opening and having protuberances for engaging said tab means for locking said ring about said body means and securing said body means with said socket, said locking means including a key operated lock for securing said locking means to said ring and having actuating means coupled with said lock and said switch means for operating said switch means while said locking means is coupled with said ring.

9. The combination of claim 8 wherein said switch means includes rotatable arm means having fingers for separating electrical contacts coupled with said line and load conductors, and rotation of said arm means to a first position by said locking means moves said fingers between said contacts and rotation to a second position removes said fingers from between said contacts.

10. The combination of claim 8 wherein said locking means includes slidable bar means for engaging said tab means on said ring for retaining said cap of said locking means substantially flush with respect to the periphery of said ring.

References Cited

UNITED STATES PATENTS 3,167,690  1/1965  Wallman _____ 317—108

ROBERT K. SCHAEFER, *Primary Examiner.*